US012253035B2

(12) United States Patent
Ebe

(10) Patent No.: US 12,253,035 B2
(45) Date of Patent: Mar. 18, 2025

(54) ENGINE CONTROL DEVICE

(71) Applicant: ISUZU MOTORS LIMITED, Yokohama (JP)

(72) Inventor: Atsushi Ebe, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/542,907

(22) Filed: Dec. 18, 2023

(65) Prior Publication Data

US 2024/0209804 A1 Jun. 27, 2024

(30) Foreign Application Priority Data

Dec. 26, 2022 (JP) ................................ 2022-207920

(51) Int. Cl.

*F02B 3/00* (2006.01)
*F02D 13/02* (2006.01)
*F02D 13/06* (2006.01)
*F02D 29/06* (2006.01)
*F02D 41/00* (2006.01)
*F02D 41/38* (2006.01)

(52) U.S. Cl.

CPC ......... *F02D 13/0242* (2013.01); *F02D 13/06* (2013.01); *F02D 29/06* (2013.01); *F02D 41/009* (2013.01); *F02D 41/38* (2013.01); *F02D 2041/389* (2013.01); *F02D 2250/24* (2013.01)

(58) Field of Classification Search

CPC ............. F02D 13/06; F02D 2041/0012; F02D 41/0087; F01L 13/0005; F01L 2013/001; F01N 2430/02

USPC ......................................................... 123/294

See application file for complete search history.

(56) References Cited

U.S. PATENT DOCUMENTS 11,391,227 B1 * 7/2022 Kiwan ................ F02D 41/0087
2011/0307158 A1 * 12/2011 Imamura .................. F02P 11/00 701/102
2020/0309051 A1 * 10/2020 Kelly .................. F02D 41/1497
(Continued)

FOREIGN PATENT DOCUMENTS

JP 2010112280 A 5/2010
JP 2010112281 A 5/2010
(Continued)

*Primary Examiner* — Long T Tran
*Assistant Examiner* — James J Kim
(74) *Attorney, Agent, or Firm* — Shih IP Law Group, PLLC.

(57) ABSTRACT

An engine control device includes: a compression release cylinder selecting part that selects, from a plurality of cylinders, one or more compression release cylinders to which fuel is not to be injected, depending on the magnitude of a required torque of an engine having the plurality of cylinders connected to an exhaust pipe provided with a catalyst for purifying exhaust gas; an exhaust valve control part that opens the exhaust valve of the compression release cylinder; a fuel injection amount determining part that determines the amount of fuel to be injected into an operating cylinder that differs from the compression release cylinder among the plurality of cylinders, according to a load torque generated by opening the exhaust valve and the required torque; and an injection control part that causes fuel, according to the determined amount of fuel injection, to be injected into the operating cylinder.

8 Claims, 10 Drawing Sheets

(56) References Cited

U.S. PATENT DOCUMENTS

| | | | | |
|---|---|---|---|---|
| 2022/0169233 | A1* | 6/2022 | Suzuki | B60W 10/08 |
| 2022/0333509 | A1* | 10/2022 | Kiwan | F02D 13/06 |

FOREIGN PATENT DOCUMENTS

| | | | |
|---|---|---|---|
| JP | 2021025492 | A | 2/2021 |
| JP | 2021025495 | A | 2/2021 |

* cited by examiner

| | STATE | AMOUNT OF FUEL INJECTION | TORQUE | EXHAUST GAS TEMPERATURE |
|---|---|---|---|---|
| CYLINDER 3a | COMPRESSION RELEASE | 0 | −0. 5 | MODERATE |
| CYLINDER 3b | COMPRESSION RELEASE | 0 | −0. 5 | MODERATE |
| CYLINDER 3c | OPERATION | 1. 5 | 1. 5 | HIGH |
| CYLINDER 3d | OPERATION | 1. 5 | 1. 5 | HIGH |
| TOTAL | | 3. 0 | 2. 0 | |

FIG. 3

| | STATE | AMOUNT OF FUEL INJECTION | TORQUE | EXHAUST GAS TEMPERATURE |
|---|---|---|---|---|
| CYLINDER 3a | OPERATION | 0. 5 | 0. 5 | LOW |
| CYLINDER 3b | OPERATION | 0. 5 | 0. 5 | LOW |
| CYLINDER 3c | OPERATION | 0. 5 | 0. 5 | LOW |
| CYLINDER 3d | OPERATION | 0. 5 | 0. 5 | LOW |
| TOTAL | | 2. 0 | 2. 0 | |

FIG. 4

| | T11 | T12 | T13 | T14 |
|---|---|---|---|---|
| CYLINDER 3a | COMPRESSION RELEASE | OPERATION | OPERATION | OPERATION |
| CYLINDER 3b | OPERATION | COMPRESSION RELEASE | OPERATION | OPERATION |
| CYLINDER 3c | OPERATION | OPERATION | COMPRESSION RELEASE | OPERATION |
| CYLINDER 3d | OPERATION | OPERATION | OPERATION | COMPRESSION RELEASE |

FIG. 11

ENGINE CONTROL DEVICE

CROSS-REFERENCE TO RELATED APPLICATIONS

The present application claims priority to Japanese Patent Application number 2022-207920, filed on Dec. 26, 2022, contents of which are incorporated herein by reference in their entirety.

BACKGROUND OF THE INVENTION

The present disclosure relates to an engine control device for causing fuel to be injected into an engine having a plurality of cylinders.

There is known a technique for increasing the temperature of exhaust gas in order to increase the temperature of a catalyst, provided in an exhaust pipe through which exhaust gas of a vehicle's engine passes, that purifies the exhaust gas when the temperature of the catalyst reaches an activation temperature. Japanese Unexamined Patent Application Publication No. 2010-122280 discloses a technique for increasing the temperature of exhaust gas by operating a compression release brake that opens an exhaust valve during the compression process of a cylinder of an engine when the engine is decelerating without a load.

However, in the above-described technique, if the compression release brake is operated when the engine is not in a deceleration state without a load, the load is generated against the engine, which may slow down the vehicle. Therefore, the temperature of exhaust gas can be increased only when the engine is in the deceleration state without a load.

BRIEF SUMMARY OF THE INVENTION

The present disclosure has been made in view of these points, and its object is to increase the temperature of exhaust gas regardless of the operating state of an engine.

An aspect of the present disclosure provides an engine control device including: a required torque acquiring part that acquires a required torque for an engine having a plurality of cylinders connected to an exhaust pipe which is provided with a catalyst for purifying exhaust gas when a temperature of the catalyst reaches an activation temperature; a compression release cylinder selecting part that selects, from the plurality of cylinders, one or more compression release cylinders for opening an exhaust valve without causing fuel to be injected during a compression process, depending on magnitude of the required torque; an exhaust valve control part that opens an exhaust valve of the compression release cylinder during a compression process of the compression release cylinder; a fuel injection amount determining part that determines an amount of fuel to be injected into an operating cylinder, which is a cylinder other than the compression release cylinder among the plurality of cylinders, where fuel is caused to be injected, according to a load torque generated by opening the exhaust valve and the required torque; and an injection control part that controls a fuel injector that injects fuel into each cylinder to inject fuel, according to the amount of fuel injection determined by the fuel injection amount determining part, into the operating cylinder.

BRIEF DESCRIPTION OF THE DRAWINGS

FIG. 3 is a diagram for explaining a relationship among the amount of fuel injection, torque, and exhaust gas temperature according to the embodiment.

FIG. 4 is a diagram for explaining a relationship among the amount of fuel injection, torque, and exhaust gas temperature of a device according to the comparative example.

FIG. 11 is a diagram for explaining the selection of a compression release cylinder so as to cause the durations for which cylinders are selected as compression release cylinders to be equal.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Outline of the Engine Control Device 1

Figure 1:
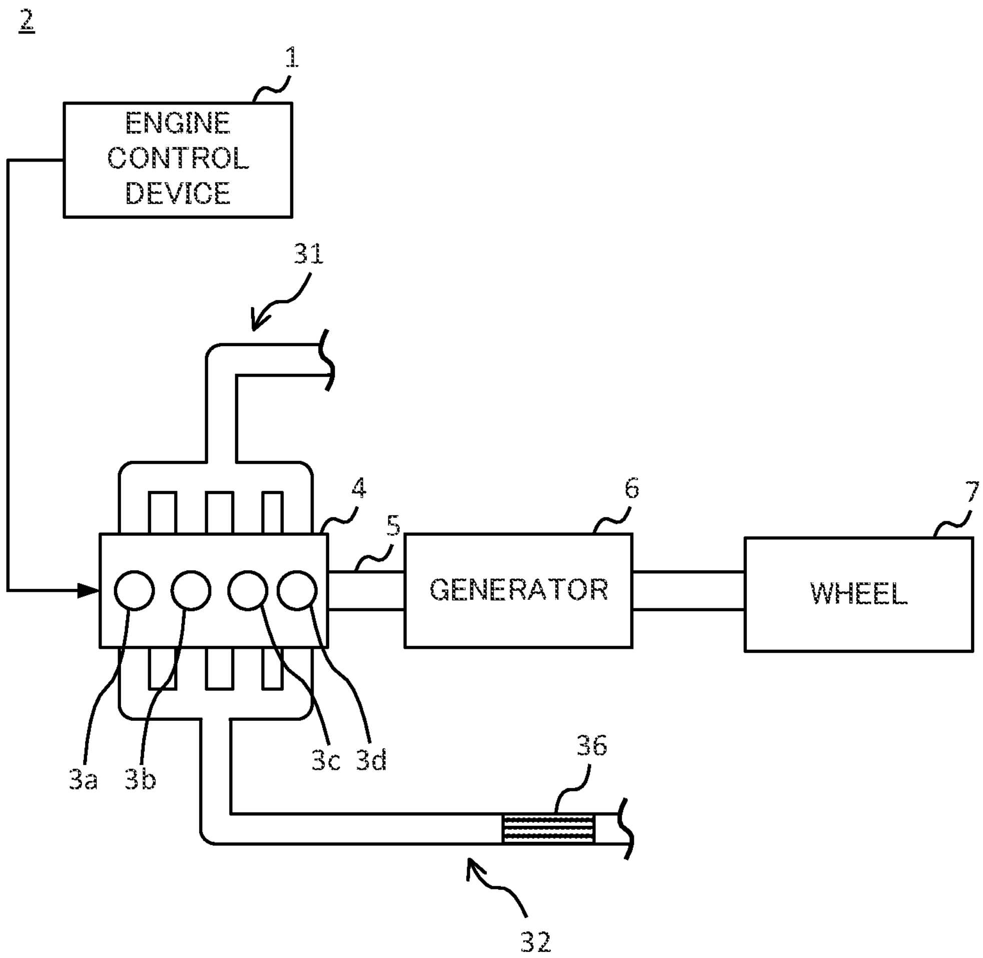
FIG. 1 is a diagram illustrating an outline of an engine control device.

FIG. 1 is a diagram illustrating an outline of an engine control device 1. The engine control device 1 is mounted in a vehicle 2. An engine 4 having a first cylinder 3*a*, a second cylinder 3*b*, a third cylinder 3*c*, and a fourth cylinder 3*d* is mounted in the vehicle 2. Hereinafter, if no distinction is necessary among the first cylinder 3*a*, the second cylinder 3*b*, the third cylinder 3*c*, and the fourth cylinder 3*d*, each cylinder is referred to as a cylinder 3. The engine 4 is an internal combustion engine that generates power by combustion and expansion of a mixture of fuel and intake air (air). The engine 4 is a diesel engine, for example, but may be a gasoline engine. A generator 6 and a wheel 7 are connected to an output shaft 5 of the engine 4 via a gear, a shaft, and a transmission (not shown). An intake pipe 31 and an exhaust pipe 32 are connected to each cylinder 3 of the engine 4. The engine control device 1 controls the injecting of fuel by the engine 4 of the vehicle 2 into each cylinder 3.

Figure 2:
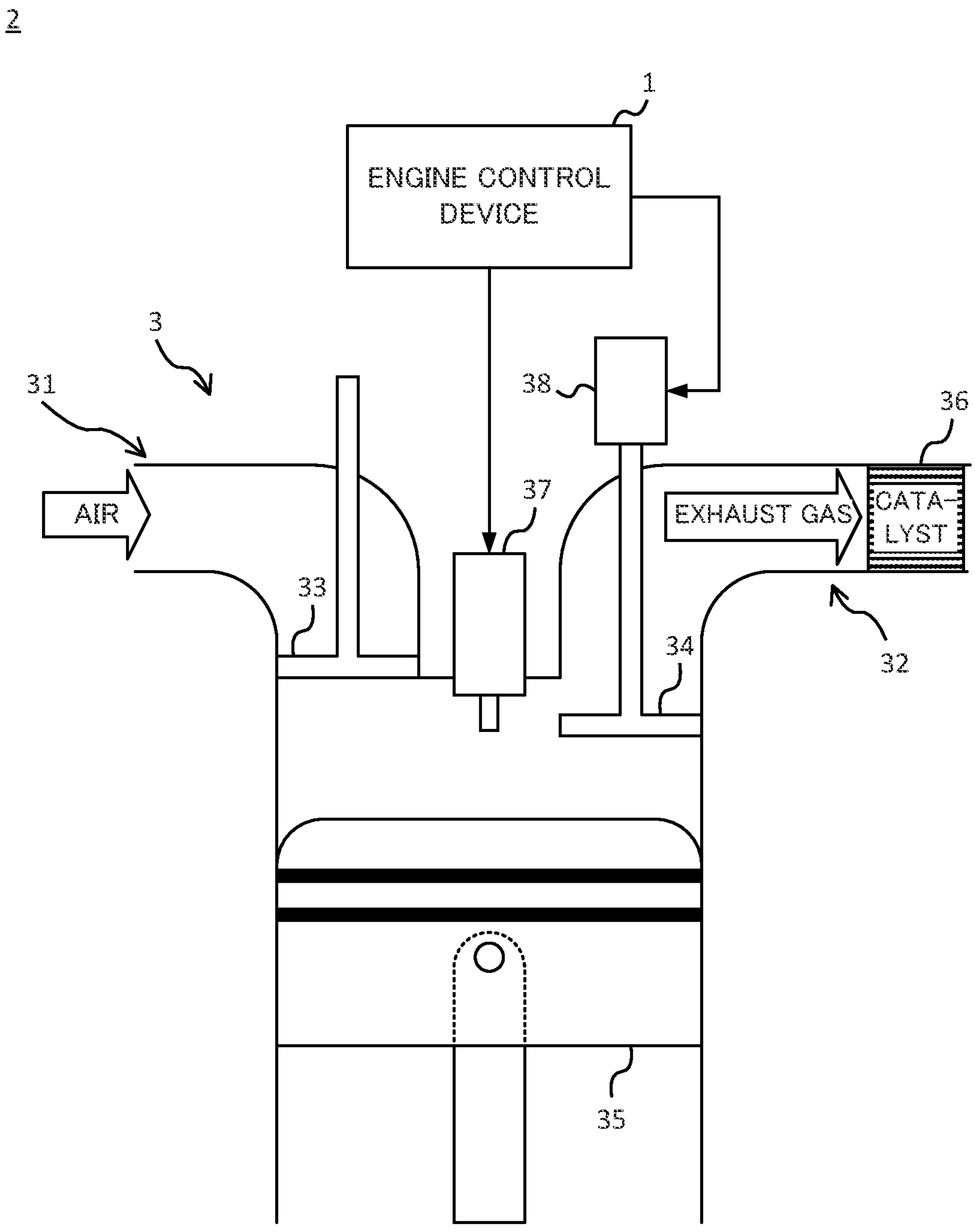
FIG. 2 is a schematic diagram of a cylinder of an engine.

FIG. 2 is a schematic diagram of the cylinder 3 of the engine 4. An intake valve 33 and an exhaust valve 34 of the cylinder 3 are closed at the start of an operation cycle of the engine 4. First, when a piston 35 moves downward, the intake valve 33 is opened to take air into the cylinder 3 (intake process). Next, the intake valve 33 is closed when the piston 35 reaches the bottom dead center, and air is compressed when the piston 35 moves upward toward the top dead center (compression process). Subsequently, fuel is injected by a fuel injector 37, and fuel mixed with the compressed and heated air is burned, causing the expanded combustion gas to push the piston 35 downward toward the bottom dead center (combustion process). Then, the exhaust valve 34 is opened when the piston 35 moves upward toward the top dead center again due to inertia or expansion in the other cylinders 3, thereby pushing the combustion gas out of the cylinder and discharging the combustion gas into the exhaust pipe 32 as exhaust gas (exhaust process).

The exhaust pipe 32 through which the exhaust gas discharged from the engine 4 passes is provided with a catalyst 36 for purifying the exhaust gas. The catalyst 36 purifies the exhaust gas when the catalyst 36 reaches an activation temperature. The activation temperature is determined according to the type and performance of the catalyst and the specification of the vehicle 2. A specific value of the activation temperature is 200 degrees, but the embodiment is not limited thereto.

Since the catalyst 36 purifies the exhaust gas after reaching the activation temperature, the catalyst 36 cannot purify the exhaust gas when the temperature of the catalyst 36 is low, such as immediately after the engine 4 started. Due to this, the conventional device heats the catalyst 36 by opening the exhaust valve 34 and discharging compressed and heated air into the exhaust pipe 32 during the compression process of the cylinder 3 where fuel is not caused to be injected among the plurality of cylinders 3 so that the catalyst 36 reaches the activation temperature. However, opening the exhaust valve 34 during the compression process of the cylinder 3 where fuel is not caused to be injected generates a load torque in a direction that stops the rotation of the engine 4. Therefore, the conventional device can open the exhaust valve 34 in the course of the compression process of the cylinder 3 where fuel is not caused to be injected, only during operation without a load in which the output of torque is not required for the engine 4 or during deceleration operation in which the engine 4 is caused to generate braking force.

Depending on the magnitude of a required torque for the engine 4, the engine control device 1 according to the embodiment selects a compression release cylinder for opening the exhaust valve without causing fuel to be injected during the compression process. For example, the engine control device 1 increases the number of compression release cylinders to be selected as the required torque is smaller. Then, the engine control device 1 determines the amount of fuel injection to be injected into an operating cylinder other than the compression release cylinder according to the load torque and the required torque of the compression release cylinder.

FIG. 3 is a diagram for explaining a relationship among the amount of fuel injection, torque, and exhaust gas temperature according to the embodiment. A required torque of the engine 4 is [2.0]. The unit of the required torque is normalized. Specifically, the unit of the required torque is normalized by setting the maximum output torque that can be output by the cylinder 3 of the engine 4 to be 10. That is, the required torque [2.0] is 20% of the maximum output torque. The engine control device 1 selects the first cylinder **3*a* and the second cylinder 3*b* as compression release cylinders so that the sum of load torques [−0.5] of the compression release cylinders and output torques of operating cylinders where fuel is caused to be injected becomes the required torque [2.0]. The third cylinder 3*c* and the fourth cylinder 3*d* are the operating cylinders where fuel is caused to be injected. It should be noted that the load torque is a negative value since it acts in the direction of stopping the rotation of the engine 4**.

The engine control device 1 determines the amount of fuel injection so that the sum of a load torque [−0.5] of the first cylinder **3*a*, a load torque [−0.5] of the second cylinder 3*b*, and the output torques of the operating cylinders becomes the required torque [2.0]. The engine control device 1 determines that the amount of fuel to be injected into the third cylinder 3*c* and the fourth cylinder 3*d* is [1.5] so that the third cylinder 3*c* and the fourth cylinder 3*d*** respectively output a torque of [1.5].

The engine control device 1 opens the exhaust valves 34 and causes fuel in a determined amount of fuel injection to be injected into the cylinders 3 other than the compression release cylinders, during the compression processes of the cylinders 3 selected as the compression release cylinders. Since compressed and heated air is discharged from the first cylinder **3*a* and the second cylinder 3*b*, the exhaust gas temperatures of the first cylinder 3*a* and the second cylinder 3*b* are "moderate". Since fuel, in an amount of fuel injection [1.5], is caused to be injected into the third cylinder 3*c* and the fourth cylinder 3*d* in order to cause them to output the torque [1.5], the exhaust gas temperature rises, and therefore the exhaust gas temperatures of the third cylinder 3*c* and the fourth cylinder 3*d*** are [high].

FIG. 4 is a diagram for explaining a relationship among the amount of fuel injection, torque, and exhaust gas temperature of the device according to the comparative example. Unlike the embodiment, the device according to the comparative example does not select a compression release cylinder, and injects fuel into all the cylinders from the first cylinder **3*a* to the fourth cylinder 3*d*. If fuel is injected into all the four cylinders 3, the output torque of each cylinder is [0.5], and each of the exhaust gas temperatures of the cylinders from the first cylinder 3*a* to the fourth cylinder 3*d*** is [low].

As described above, the engine control device 1 of the embodiment discharges heated air from the compression release cylinder, and causes fuel, in an amount such that the sum of output torques of the operating cylinders becomes larger than a required torque, to be injected. As a result, the engine control device 1 can increase exhaust gas temperature compared to the case of injecting the same amount of fuel into all the cylinders. Hereinafter, a configuration of the engine control device 1 will be described in detail.

Configuration of the Engine Control Device 1

Figure 5:
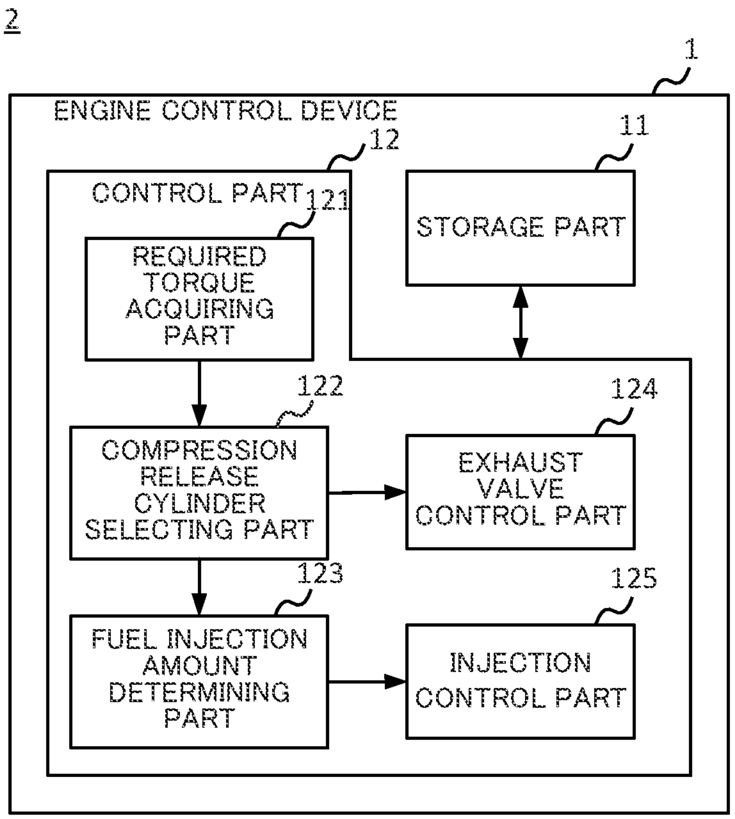
FIG. 5 is a diagram illustrating a configuration of the engine control device.

FIG. 5 is a diagram illustrating a configuration of the engine control device 1. The engine control device 1 includes a storage part 11 and a control part 12. The storage part 11 includes storage media such as a Read Only Memory (ROM), a Random Access Memory (RAM), and a hard disk. The storage part 11 stores a program executed by the control part 12.

The control part 12 is a calculation resource including a processor such as a Central Processing Unit (CPU). By executing a program stored in the storage part 11, the control part 12 functions as a required torque acquiring part 121, a compression release cylinder selecting part 122, a fuel injection amount determining part 123, an exhaust valve control part 124, and an injection control part 125.

The required torque acquiring part 121 acquires a required torque for the engine 4. For example, the required torque acquiring part 121 acquires a required torque corresponding to an accelerator opening of the vehicle 2. Specifically, the required torque acquiring part 121 references a torque map indicating a relationship between accelerator opening and required torque to acquire a required torque corresponding to an accelerator opening. The torque map is determined according to performance of the engine 4 of the vehicle 2, or the weight of the vehicle 2, for example, and is stored in advance in the storage part 11.

The compression release cylinder selecting part 122 selects, from the plurality of cylinders 3, a compression release cylinder where fuel is not caused to be injected, depending on the magnitude of the required torque that is acquired. For example, the compression release cylinder selecting part 122 increases the number of compression release cylinders to be selected as the required torque is smaller. As a specific example, if the required torque is equal to or greater than a first threshold, the compression release cylinder selecting part 122 selects one compression release cylinder, and if the required torque is equal to or less than a second threshold that is smaller than the first threshold, the compression release cylinder selecting part 122 selects three compression release cylinders, and if the required torque is equal to or greater than the second threshold and less than the first threshold, the compression release cylinder selecting part 122 selects two compression release cylinders. The first threshold and the second threshold are determined according to the maximum output torque of the engine 4, for example, and a specific value of the first threshold is one-half of the maximum output torque, and a specific value of the second threshold is one-quarter of the maximum output torque. It should be noted that the compression release cylinder selecting part 122 does not select a compression release cylinder if the required torque is equal to or greater than three-quarters of the maximum output torque.

According to a load torque and the required torque, the fuel injection amount determining part 123 determines the amount of fuel to be injected into an operating cylinder where fuel is caused to be injected, disregarding the compression release cylinder among the plurality of cylinders 3. The load torque is force that is generated, as a total of the whole operation cycle, in the direction of stopping the rotation of the engine 4 by opening the exhaust valve 34 of the compression release cylinder during the compression process of the compression release cylinder. The fuel injection amount determining part 123 determines the amount of fuel injection such that an output torque of the engine 4, at the time when fuel according to the amount of fuel injection is injected into the operating cylinder, becomes the sum of the load torque and the required torque (see FIG. 3). In other words, the fuel injection amount determining part 123 determines the sum of the absolute value of the load torque and the required torque to be the output torque to be actually output by the engine 4, and determines the amount of fuel injection for outputting the determined output torque. Specifically, the fuel injection amount determining part 123 references a fuel output map indicating a relationship between output torque of the engine 4 and the amount of fuel injection to determine the amount of fuel injection corresponding to the determined output torque. The fuel output map is determined by performance, specification, or the like of the engine 4, and is stored in the storage part 11.

The exhaust valve control part 124 opens and closes the exhaust valve 34 by controlling an actuator 38 that opens and closes the exhaust valve 34. The exhaust valve control part 124 opens the exhaust valve 34 of the compression release cylinder during the compression process of the compression release cylinder. Specifically, if the temperature of the catalyst 36 is less than the activation temperature, during the compression process of the compression release cylinder that is selected by the compression release cylinder selecting part 122, the exhaust valve control part 124 opens the exhaust valve 34 of this compression release cylinder. If the temperature of the catalyst 36 is equal to or greater than the activation temperature, the exhaust valve control part 124 keeps the exhaust valve 34 of this compression release cylinder closed without opening the exhaust valve 34, even though the compression release cylinder is selected.

The injection control part 125 controls the fuel injector 37 that injects fuel into each cylinder 3 to inject fuel, according to the amount of fuel injection determined by the fuel injection amount determining part 123, into the operating cylinder. The injection control part 125 does not cause fuel to be injected into the compression release cylinder. In this way, even if the operating state of the engine 4 is under a load such that the engine 4 is required to output torque, the engine control device 1 can discharge air that was heated during the compression process of the compression release cylinder into the exhaust pipe 32, making it possible to increase the exhaust gas temperature. Further, the engine control device 1 causes the fuel injector 37 to inject fuel, in an amount necessary for causing the engine 4 to output a torque that is larger than the required torque for the engine, into the operating cylinder. In other words, if the engine control device 1 causes the engine 4 to output a torque that is larger than the required torque, the engine control device 1 causes the fuel injector 37 to inject fuel, in an amount that is larger than an amount for causing the fuel injector 37 to inject fuel into the operating cylinder in a case where the engine 4 is caused to output the required torque, into the operating cylinder. The temperature at which an air-fuel mixture is burned in the operating cylinder, in a case where a torque that is larger than the required torque is output, is higher than the temperature at which the air-fuel mixture is burned in the operating cylinder in a case where the required torque is output. In this manner, the engine control device 1 causes the engine 4 to output a torque that is larger than the required torque, thereby causing the temperature of the exhaust gas discharged from the operating cylinder to be higher than the temperature of exhaust gas in a case where the engine is caused to output the required torque.

Since the temperature of the exhaust gas in the operating cylinder increases as the output torque of the operating becomes larger, the temperature of the exhaust gas becomes highest when the operating cylinder is outputting the maximum output torque that can be output by the operating cylinder. Accordingly, the compression release cylinder selecting part 122 selects a compression release cylinder so that the sum of the absolute value of the load torque generated by opening the exhaust valve 34 of the compression release cylinder and the required torque becomes equal to or less than the maximum output torque that can be output by the operating cylinder of the engine 4. Specifically, if a value (hereinafter, this may be referred to as "a margin torque") obtained by subtracting the absolute value of the load torque from the maximum output torque is equal to or greater than the required torque, the compression release cylinder selecting part 122 selects a compression release cylinder, and if the margin torque is less than the required torque, the compression release cylinder selecting part 122 does not select a compression release cylinder.

Figure 6:
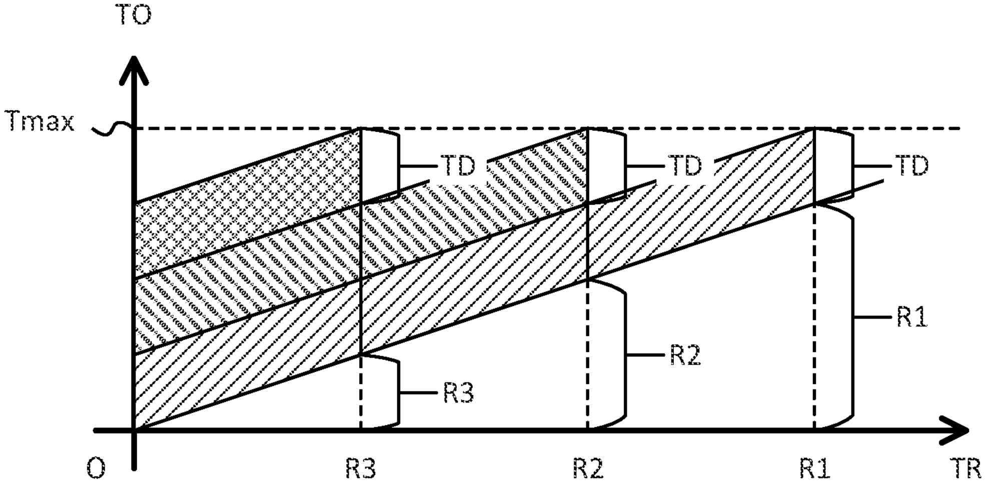
FIG. 6 is a diagram for explaining processing for selecting a compression release cylinder depending on a required torque.

FIG. 6 is a diagram for explaining processing for selecting a compression release cylinder depending on a required torque. In FIG. 6, the horizontal axis represents the magnitude of a required torque TR, and the vertical axis represents the magnitude of an output torque TO of the engine 4.

The compression release cylinder selecting part 122 selects a compression release cylinder so that the sum of an absolute value TD of a load torque and a required torque TR is equal to or less than a maximum output torque Tmax. Specifically, if the required torque is equal to or less than a margin torque R1 in a case where the absolute value TD of the load torque is subtracted from the maximum output torque Tmax, and if the required torque is larger than a margin torque R2 in a case where twice the absolute value TD of the load torque is subtracted from the maximum output torque Tmax, the compression release cylinder selecting part 122 selects one compression release cylinder. If the required torque is equal to or less than the margin torque R2, and if the required torque is larger than a margin torque R3 in a case where three times the absolute value TD of the load torque is subtracted from the maximum output torque Tmax, the compression release cylinder selecting part 122 selects two compression release cylinders. If the required torque is equal to or less than the margin torque R3, the compression release cylinder selecting part 122 selects three compression release cylinders.

In this way, the compression release cylinder selecting part 122 can operate the engine 4 to output the maximum output torque Tmax. As a result, the temperature of exhaust gas discharged from the operating cylinder becomes higher.

As shown in FIG. 1, a generator 6 is mounted in the vehicle 2. The amount of power generation of the generator 6 is variable, and a power generation torque required for power generation increases as the amount of power generation increases.

The compression release cylinder selecting part 122 selects a compression release cylinder so that the sum of the power generation torque required for the generator 6 to generate electric power and the absolute value TD of the load torque becomes a residual torque obtained by subtracting the required torque TR from the maximum output torque Tmax that can be output by the engine 4. Specifically, the compression release cylinder selecting part 122 selects one or more compression release cylinders if the maximum power generation torque required for the generator 6 to generate the maximum amount of electric power that can be generated by the generator 6 is less than the residual torque.

Figure 7:
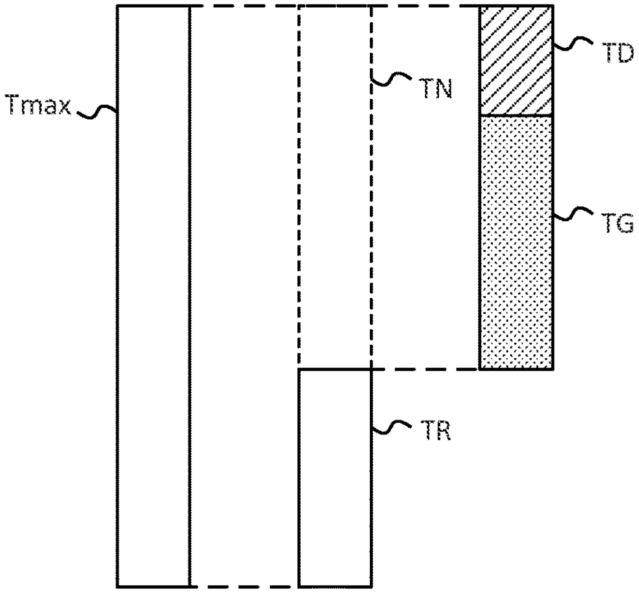
FIG. 7 is a diagram for explaining processing for selecting a compression release cylinder when a generator is caused to generate electric power.

FIG. 7 is a diagram for explaining processing for selecting a compression release cylinder when the generator 6 is caused to generate electric power. The compression release cylinder selecting part 122 calculates a residual torque TN obtained by subtracting the required torque TR from the maximum output torque Tmax. Next, the compression release cylinder selecting part 122 determines whether or not the maximum power generation torque TGmax is equal to or greater than the residual torque TN. If the maximum power generation torque TGmax is equal to or greater than the residual torque TN, the compression release cylinder selecting part 122 does not select a compression release cylinder. If the maximum power generation torque TGmax is less than the residual torque TN, the compression release cylinder selecting part 122 selects a compression release cylinder so that the sum of a power generation torque TG required for the generator 6 to generate electric power and the absolute value TD of the load torque becomes the residual torque TN. Specifically, the compression release cylinder selecting part 122 selects a compression release cylinder so that the ratio of the power generation torque TG to the residual torque TN becomes larger.

Figure 8:
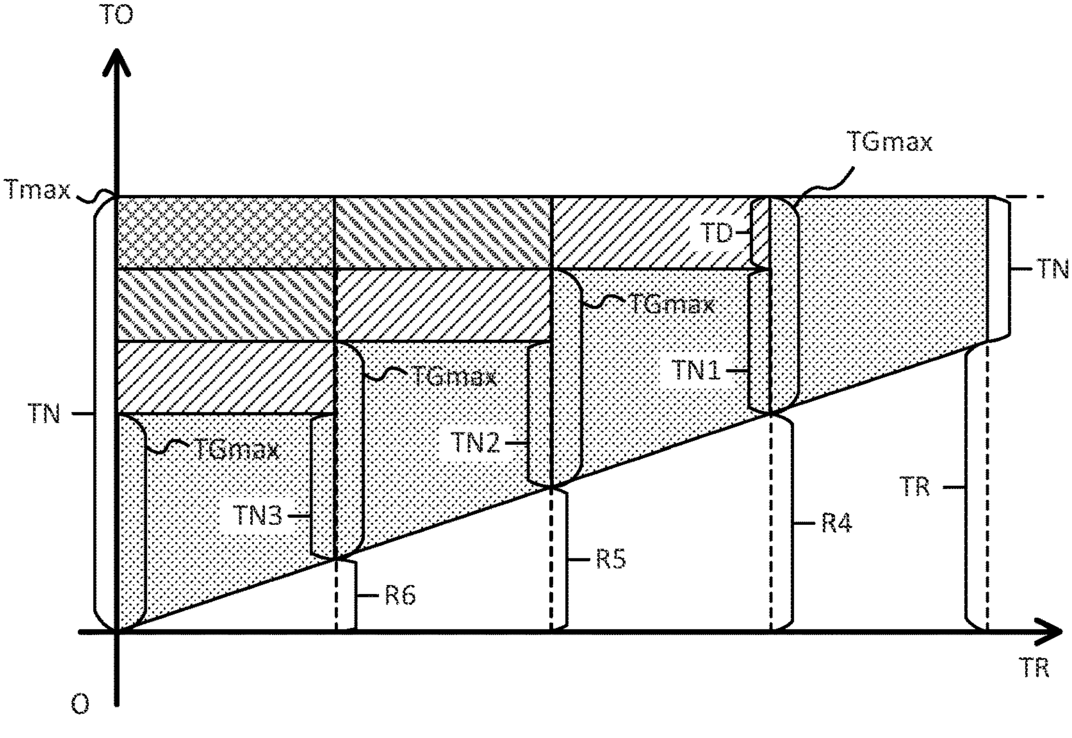
FIG. 8 is a diagram for explaining processing for selecting a compression release cylinder so as to increase the ratio of a power generation torque to a residual torque.

FIG. 8 is a diagram for explaining processing for selecting a compression release cylinder so that the ratio of the power generation torque TG to the residual torque TN becomes larger. In FIG. 8, the horizontal axis represents a required torque TR, and the vertical axis represents an output torque TO. If the maximum power generation torque TGmax is equal to or greater than the residual torque TN, the compression release cylinder selecting part 122 does not select a compression release cylinder. In other words, if the required torque TR is equal to or greater than a torque R4, the residual torque TN obtained by subtracting the torque R4 from the maximum output torque Tmax becomes equal to or less than the maximum power generation torque TGmax, and therefore the compression release cylinder selecting part 122 does not select a compression release cylinder.

If a value obtained by subtracting the absolute value TD of the load torque by one compression release cylinder from the residual torque TN is equal to or less than the maximum power generation torque TGmax when the maximum power generation torque TGmax is less than the residual torque TN, the compression release cylinder selecting part 122 selects one or more compression release cylinders. Specifically, if the required torque TR is equal to or greater than a torque R5 and less than the torque R4, a value TN1 obtained by subtracting the absolute value TD of one load torque from the residual torque TN becomes equal to or less than the maximum power generation torque TGmax, and therefore the compression release cylinder selecting part 122 selects one compression release cylinder.

If a value obtained by subtracting the absolute value TD of the load torque by one compression release cylinder from the residual torque TN is larger than the maximum power generation torque TGmax, the compression release cylinder selecting part 122 selects two or more compression release cylinders. Specifically, if the required torque TR is equal to or greater than a torque R6 and less than the torque R5, a value TN2 obtained by subtracting twice the absolute value TD of the load torque from the residual torque TN becomes equal to or less than the maximum power generation torque TGmax, and therefore the compression release cylinder selecting part 122 selects two compression release cylinders.

If a value obtained by subtracting twice the absolute value TD of the load torque by the compression release cylinder from the residual torque TN is larger than the maximum power generation torque TGmax, the compression release cylinder selecting part 122 selects three compression release cylinders. Specifically, if the required torque TR is less than the torque R6, a value TN3 obtained by subtracting three times the absolute value TD of the load torque from the residual torque TN becomes equal to or less than the maximum power generation torque TGmax, and therefore the compression release cylinder selecting part 122 selects three compression release cylinders. In this manner, the compression release cylinder selecting part 122 can cause the generator 6 to generate more electric power while causing the engine 4 to output the maximum output torque Tmax.

Since the electric power that can be generated changes depending on the state of charge of the battery, the compression release cylinder selecting part 122 may change the balance between the number of compression release cylinders and power generation. For example, if the amount of charge of the battery is less than a determination threshold, the compression release cylinder selecting part 122 reduces the number of compression release cylinders and increases the amount of power generation, and if the amount of charge of the battery is equal to or greater than the determination threshold, the compression release cylinder selecting part 122 increases the number of compression release cylinders and decreases the amount of power generation. The determination threshold is one-half of the maximum amount of charge of the battery, for example, but the embodiment is not limited thereto. As a result, the compression release cylinder selecting part 122 can increase the amount of power generation for charging the battery when the amount of charge of the battery becomes less than the determination threshold, so that it is possible to prevent the amount of charge of the battery from becoming equal to or less than the determination threshold.

Figure 9:
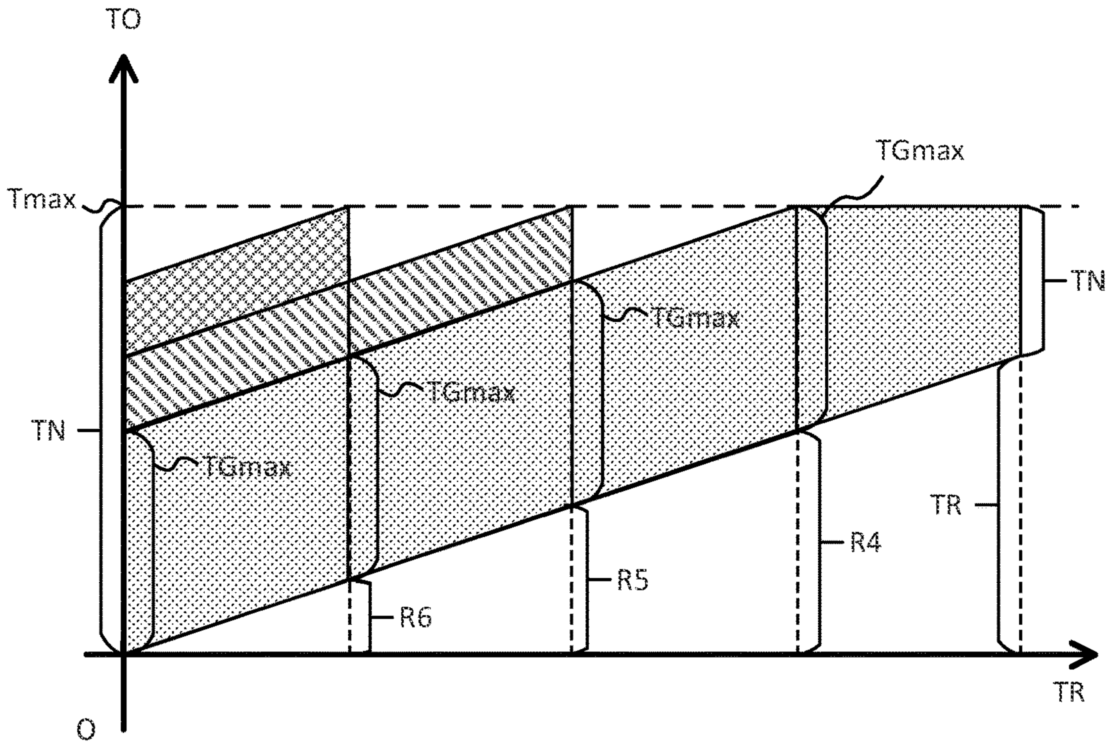
FIG. 9 is a diagram for explaining processing for increasing the amount of power generation by reducing the number of compression release cylinders.

FIG. 9 is a diagram for explaining processing for increasing the amount of power generation by reducing the number of compression release cylinders. If the amount of charge of the battery is less than the determination threshold, the compression release cylinder selecting part 122 selects a compression release cylinder so that the generator 6 can achieve the maximum amount of power generation. For example, if the amount of charge of the battery is less than the determination threshold, the compression release cylinder selecting part 122 does not select a compression release cylinder even if the required torque TR is equal to or greater than the torque R5 and less than the torque R4. Therefore, the compression release cylinder selecting part 122 can charge the battery in which remaining capacity is less than the determination threshold. It should be noted that the injection control part 125 controls the fuel injector 37 to inject fuel, in an amount by which the engine 4 outputs a torque obtained by adding the maximum power generation torque TGmax to the required torque TR, into the cylinder 3.

Figure 10:
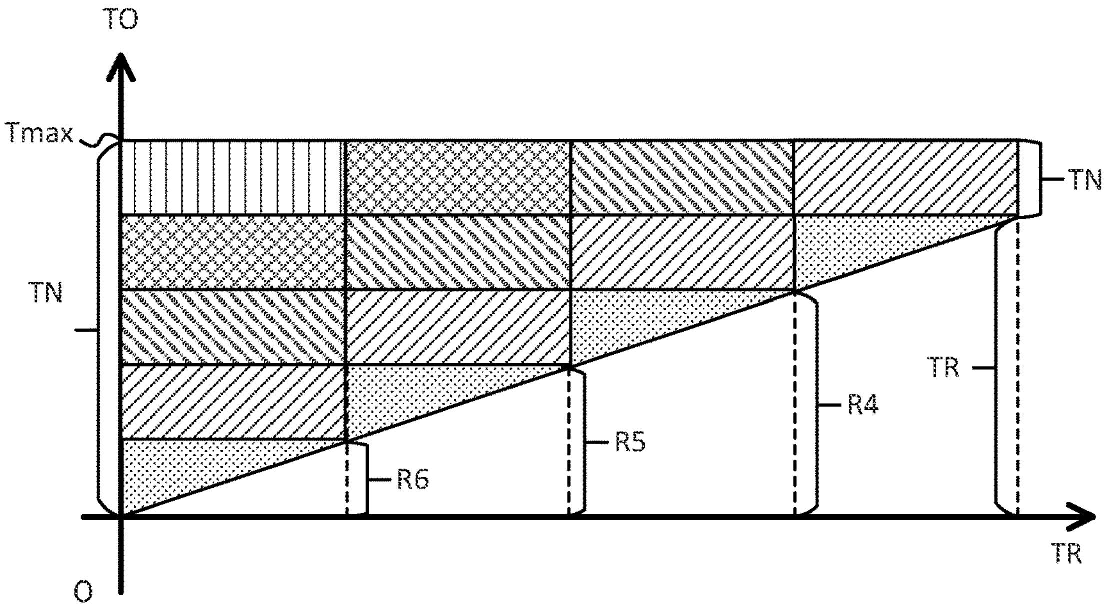
FIG. 10 is a diagram for explaining processing for increasing the number of compression release cylinders and reducing the amount of power generation when the amount of charge of a battery is equal to or greater than a determination threshold.

If the amount of charge of the battery is equal to or greater than the determination threshold, the compression release cylinder selecting part 122 increases the number of compression release cylinders and decreases the amount of power generation. FIG. 10 is a diagram for explaining processing for increasing the number of compression release cylinders and reducing the amount of power generation when the amount of charge of the battery is equal to or greater than the determination threshold. If the amount of charge of the battery is equal to or greater than an overcharging prevention threshold that is larger than the determination threshold, the compression release cylinder selecting part 122 selects one or more compression release cylinders even if the maximum power generation torque TGmax is equal to or greater than the residual torque TN. The overcharging prevention threshold is a threshold for preventing the battery from being overcharged, for example, and is nine-tenth of the maximum amount of charge, but the embodiment is not limited thereto. Therefore, the compression release cylinder selecting part 122 can increase the temperature of exhaust gas while preventing the battery from being overcharged.

If the amount of charge of the battery is equal to or greater than the overcharging prevention threshold, and if the required torque is equal to or less than a predetermined value, the compression release cylinder selecting part 122 may select all the cylinders 3 of the engine 4 as compression release cylinders. In this case, the engine control device 1 operates a clutch (not shown) provided between the engine 4 and the generator 6 to break the connection between the engine 4 and the generator 6, thereby causing the generator 6 to operate as an electric motor (motor). Due to this, the engine control device 1 can increase the temperature of exhaust gas while reducing the fuel consumption. If the amount of charge of the battery becomes less than the overcharging prevention threshold, the engine control device 1 operates the clutch to connect the engine 4 and the generator 6. If the amount of charge of the battery becomes less than the overcharging prevention threshold, and if the engine 4 and the generator 6 are connected, the compression release cylinder selecting part 122 selects a compression release cylinder so that the ratio of the power generation torque TG to the residual torque TN becomes larger.

If the maximum output torque Tmax changes due to a change in the surrounding environment of the vehicle 2, the compression release cylinder selecting part 122 selects a compression release cylinder so that the sum of the absolute value TD of the load torque and the required torque TR becomes equal to or less than the maximum output torque Tmax after the change. For example, if the maximum output torque Tmax decreases, the compression release cylinder selecting part 122 selects a compression release cylinder so that the sum of the absolute value TD of the load torque and the required torque TR does not exceed the decreased maximum output torque Tmax.

Continuing to cause fuel to be injected into the same cylinder and selecting the same cylinder as a compression release cylinder may result in a difference in wear and tear of each cylinder 3. Accordingly, the compression release cylinder selecting part 122 selects a compression release cylinder from the plurality of cylinders so that the duration of compression release for each cylinder 3 serving as a compression release cylinder becomes equal. For example, the compression release cylinder selecting part 122 selects a different cylinder 3 as a compression release cylinder every predetermined period. Specifically, the compression release cylinder selecting part 122 selects one cylinder 3 as a compression release cylinder in a first period, and when the first period ends and the second period begins, the compression release cylinder selecting part 122 selects, as a compression release cylinder, a cylinder 3 that is different from the cylinder 3 selected as the compression release cylinder in the first period. FIG. 11 is a diagram for explaining the selection of a compression release cylinder so as to cause the duration that each cylinder 3 is selected as a compression release cylinder to be equal.

The compression release cylinder selecting part 122 selects the first cylinder **3*a* as a compression release cylinder in a first period T11, and selects the second cylinder 3*b* as a compression release cylinder in a second period T12 after the first period T11 has ended. In this way, the compression release cylinder selecting part 122 selects each cylinder 3 from the first cylinder 3*a* to the fourth cylinder 3*d* in turn, as a compression release cylinder every predetermined period. It should be noted that the predetermined period is the number of times of performing a series of operations (hereinafter, referred to as a "cycle") in which an air-fuel mixture is taken into a combustion chamber and combusted to discharge combustion gas. For example, the predetermined period may be appropriately determined, and is 100 cycles, for example, but the embodiment is not limited thereto. Further, the order in which the compression release cylinder selecting part 122 selects a compression release cylinder is arbitrary, as long as the cumulative number of cycles when any cylinder 3 is selected as a compression release cylinder is equal. That is, a cylinder to be selected as a compression release cylinder after the first cylinder 3***a* may be any of the second cylinder 3*b*, the third cylinder 3*c*, and the fourth cylinder 3*d*.

In a case where two or more cylinders 3 are selected as compression release cylinders, the compression release cylinder selecting part 122 selects compression release cylinders from the plurality of cylinders 3 so that the duration of compression release for each cylinder 3 serving as a compression release cylinder becomes equal, in a similar manner as in a case where one cylinder 3 is selected as a compression release cylinder. In this case, the compression release cylinder selecting part 122 may select, in the second period, one cylinder 3 that was selected as a compression release cylinder in the first period. In a case of selecting two or more cylinders 3 as compression release cylinders, the compression release cylinder selecting part 122 selects compression release cylinders from the plurality of cylinders 3 so that the duration of compression release for each cylinder 3 serving as a compression release cylinder becomes equal at a timing when a period that is longer than the predetermined period has passed. The period that is longer than the predetermined period is 100 times the predetermined period, for example, but the embodiment is not limited thereto.

Figure 12:
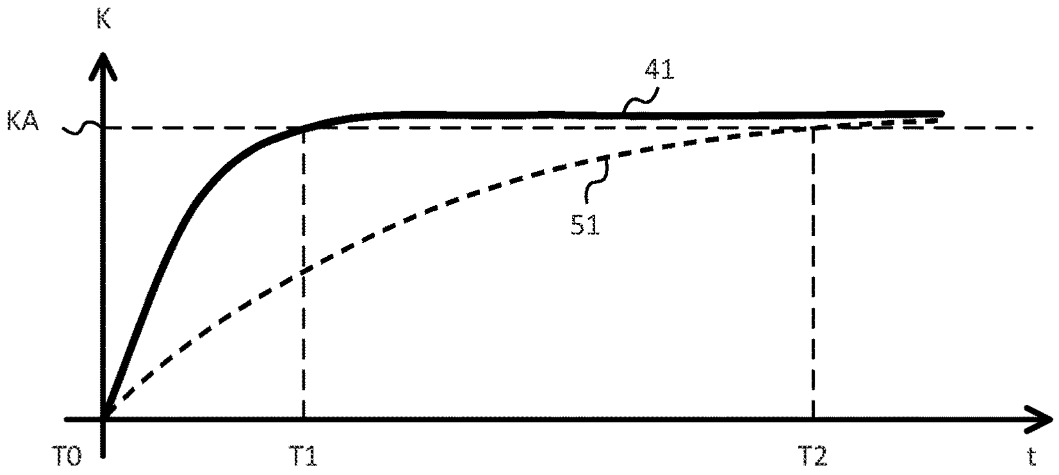
FIG. 12 is a graph showing change over time in the temperature of a catalyst.

FIG. 12 is a graph showing change over time in the temperature of the catalyst 36. In FIG. 12, the horizontal axis represents a timing t, and the vertical axis represents a temperature K. A timing T0 is a timing when the engine 4 is started. The solid line 41 is a line showing change over time in the temperature of the catalyst 36 according to the embodiment. The dotted line 51 is a line showing change over time in the temperature of the catalyst according to the comparative example. In the comparative example, unlike the engine control device 1 according to the embodiment, a compression release cylinder is not selected, and fuel is injected into all the cylinders.

As indicated by the solid line 41, at a timing T1, the temperature of the catalyst 36 according to the embodiment exceeds an activation temperature KA allowing the catalyst 36 to purify exhaust gas. As indicated by the dotted line 51, the temperature of the catalyst according to the comparative example does not exceed the activation temperature KA until a timing T2 that is after the timing T1. In this manner, since the temperature of the catalyst 36 according to the embodiment exceeds the activation temperature KA earlier than the temperature of the catalyst according to the comparative example, it is possible to purify the exhaust gas earlier.

Figure 13:
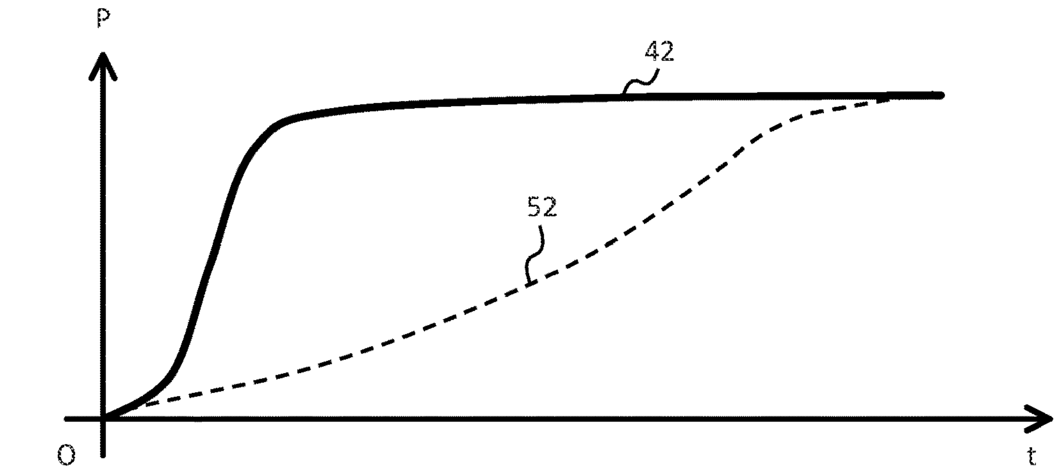
FIG. 13 is a graph showing change over time in a purification rate P of nitrogen oxide contained in exhaust gas.

FIG. 13 is a graph showing change over time in a purification rate P of nitrogen oxide contained in exhaust gas. In FIG. 13, the horizontal axis represents a timing t, and the vertical axis represents the purification rate P. The higher the purification rate P is, the less nitrogen oxide contained in the exhaust gas. The solid line 42 is a line showing change over time in the purification rate P of the embodiment. The dotted line 52 is a graph showing change over time in the purification rate P of the comparative example. As shown in FIG. 13, the purification rate P of the embodiment is saturated earlier than the purification rate P of the comparative example. That is, the catalyst 36 of the embodiment can remove more nitrogen oxide compared to the catalyst according to the comparative example.

Figure 14:
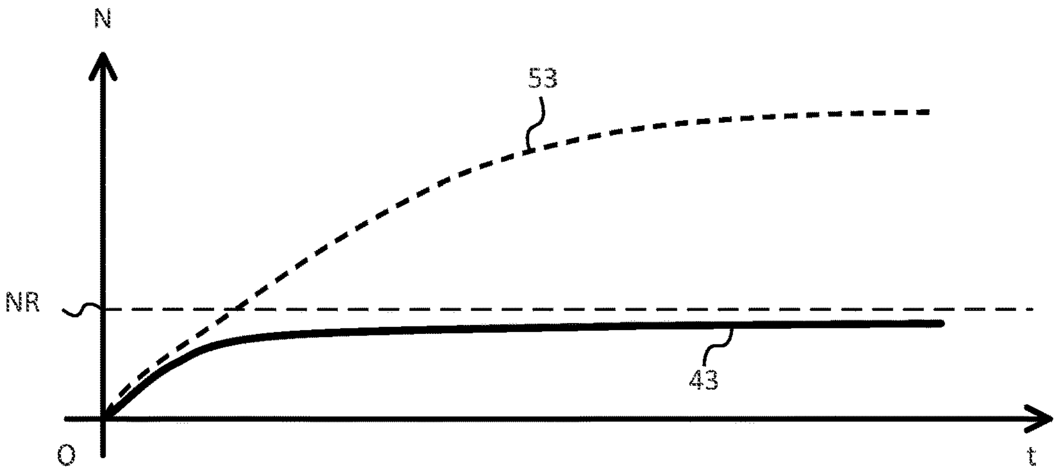
FIG. 14 is a graph showing change over time in an integrated value of the amount of nitrogen oxide contained in exhaust gas after passing through the catalyst.

FIG. 14 is a graph showing change over time in an integrated value N of the amount of nitrogen oxide contained in exhaust gas after passing through the catalyst. In FIG. 14, the horizontal axis represents a timing t, and the vertical axis represents the integrated value N. The solid line 43 is a line showing change over time in an integrated value of the amount of nitrogen oxide in the embodiment. The dotted line 53 is a line showing change over time in an integrated value of the amount of nitrogen oxide in the comparative example. As indicated by the solid line 43, the integrated value of the amount of nitrogen oxide in the embodiment does not exceed a regulation value NR. In contrast, as indicated by the dotted line 53, the integrated value of the amount of nitrogen oxide in the comparative example exceeds the regulation value NR.

Figure 15:
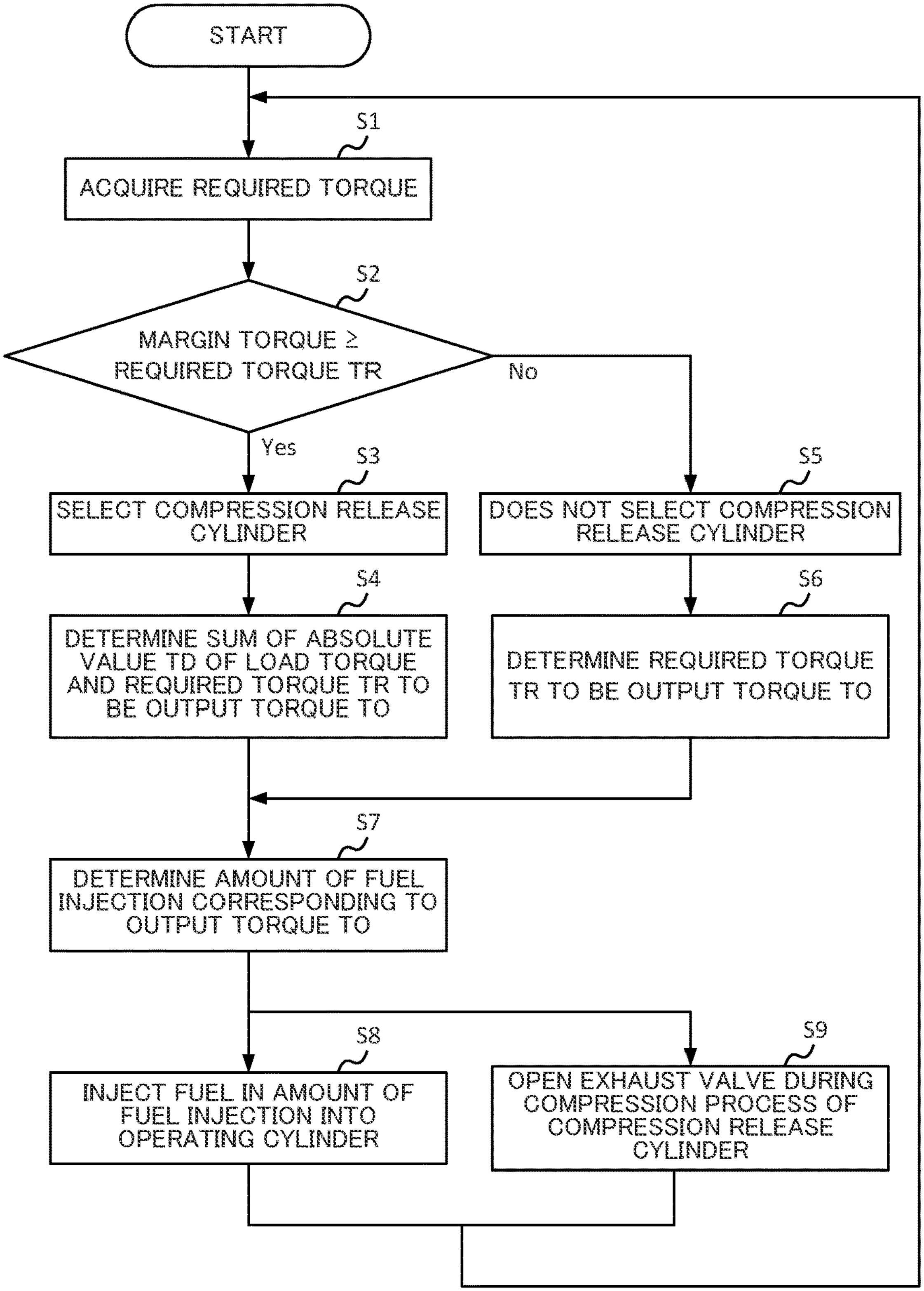
FIG. 15 is a flowchart showing an example of processing by the engine control device for increasing the temperature of exhaust gas.

Processing by the Engine Control Device 1 for Increasing Exhaust Gas Temperature FIG. 15 is a flowchart showing an example of processing by the engine control device 1 for increasing the exhaust gas temperature. The processing shown by the flowchart of FIG. 15 is executed at predetermined intervals while the engine 4 is activated. The predetermined interval is a processing interval for the control part 12, for example, but the embodiment is not limited thereto. If the temperature of the catalyst 36 is less than the activation temperature, the engine control device 1 executes processing for increasing the exhaust gas temperature, and if the temperature of the catalyst 36 is equal to or greater than the activation temperature, the engine control device 1 does not execute the processing for increasing the exhaust gas temperature.

First, the required torque acquiring part 121 acquires a required torque TR (step S1). For example, the required torque acquiring part 121 acquires the required torque TR corresponding to an accelerator opening of the vehicle 2. Subsequently, the compression release cylinder selecting part 122 determines whether or not a margin torque obtained by subtracting the absolute value TD of a load torque from the maximum output torque Tmax is equal to or greater than the required torque TR (step S2).

If the margin torque is equal to or greater than the required torque TR ("Yes" in step S2), the compression release cylinder selecting part 122 selects one or more compression release cylinders from the plurality of cylinders 3 (step S3). For example, the compression release cylinder selecting part 122 selects a compression release cylinder so that the sum of the absolute value TD of the load torque generated by opening the exhaust valve 34 of the compression release cylinder and the required torque TR does not exceed the maximum output torque Tmax of the engine 4. Then, the fuel injection amount determining part 123 determines the sum of the absolute value TD of the load torque and the required torque TR to be an output torque TO (step S4).

If the margin torque is less than the required torque TR ("No" in step S2), the compression release cylinder selecting part 122 does not select a compression release cylinder (step S5). If a compression release cylinder is not selected, the fuel injection amount determining part 123 determines the required torque TR to be the output torque TO (step S6).

The fuel injection amount determining part 123 determines the amount of fuel injection corresponding to the determined output torque TO (step S7). Specifically, the fuel injection amount determining part 123 references a fuel output map indicating a relationship between the output torque TO of the engine 4 and the amount of fuel injection to determine the amount of fuel injection corresponding to the determined output torque TO.

The injection control part 125 controls the fuel injector 37 that injects fuel into each cylinder 3 to inject fuel, according to an amount of fuel injection determined by the fuel injection amount determining part 123, into an operating cylinder (step S8). The exhaust valve control part 124 opens the exhaust valve 34 of the compression release cylinder during the compression process of the compression release cylinder (step S9). The steps S8 and S9 are executed in parallel.

Effect of the Engine Control Device 1

As described above, the engine control device 1 selects, from the plurality of cylinders 3, a compression release cylinder for opening the exhaust valve without causing fuel to be injected during the compression process, depending on the magnitude of a required torque for the engine 4 having the plurality of cylinders 3 connected to the exhaust pipe 32 that is provided with the catalyst 36 for purifying exhaust gas when the catalyst 36 reaches the activation temperature. Next, the engine control device 1 determines the amount of fuel to be injected into an operating cylinder other than the compression release cylinder among the plurality of cylinders 3 according to a load torque generated by opening the exhaust valve 34 and a required torque. Then, the engine control device 1 opens the exhaust valve 34 of the compression release cylinder during the compression process of the compression release cylinder, and controls the fuel injector 37 that injects fuel into each cylinder 3, and causes fuel, according to the determined amount of fuel injection, to be injected into the operating cylinder.

According to the above-described configuration, the engine control device 1 discharges air that was heated in the compression process of the compression release cylinder into the exhaust pipe 32. Further, since the engine control device 1 causes fuel, in an amount corresponding to the load torque and the required torque, to be injected into the operating cylinder, the exhaust gas temperature can be increased regardless of whether the engine 4 is under load or not under load. Further, since the engine control device 1 causes fuel, in an amount that is larger than an amount corresponding only to the required torque, to be injected into the cylinder 3, it is possible to increase the temperature of the exhaust gas discharged from the operating cylinder to be higher than the temperature of the exhaust gas in a case of causing fuel, in an amount corresponding only to the required torque, to be injected into the operating cylinder.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An engine control device comprising:

a required torque acquiring part that acquires a required torque for an engine having a plurality of cylinders connected to an exhaust pipe which is provided with a catalyst for purifying exhaust gas when a temperature of the catalyst reaches an activation temperature;

a compression release cylinder selecting part that selects, from the plurality of cylinders, one or more compression release cylinders for opening an exhaust valve without causing fuel to be injected during a compression process, depending on magnitude of the required torque;

an exhaust valve control part that opens an exhaust valve of the compression release cylinder during a compression process of the compression release cylinder;

a fuel injection amount determining part that determines an amount of fuel to be injected into an operating cylinder, which is a cylinder other than the compression release cylinder among the plurality of cylinders, where fuel is caused to be injected, according to a load torque generated by opening the exhaust valve and the required torque; and an injection control part that controls a fuel injector that injects fuel into each cylinder to inject fuel, according to the amount of fuel injection determined by the fuel injection amount determining part, into the operating cylinder, wherein the compression release cylinder selecting part selects the one or more compression release cylinders so that a sum of a power generation torque required for a generator, connected to the engine, to generate electric power and the load torque becomes a residual torque obtained by subtracting the required torque from the maximum output torque that can be output by the engine, and a ratio of the power generation torque to the remaining torque becomes large.

2. The engine control device according to claim 1, wherein the compression release cylinder selecting part increases the number of the compression release cylinders to be selected as the required torque is smaller.

3. The engine control device according to claim 1, wherein the compression release cylinder selecting part selects the one or more compression release cylinders so that a sum of an absolute value of the load torque generated by opening the exhaust valves of the one or more compression release cylinders and the required torque becomes equal to or less than a maximum output torque that can be output by the operating cylinder of the engine.

4. The engine control device according to claim 1, wherein the engine has four or more cylinders, the compression release cylinder selecting part selects one compression release cylinder if the required torque is equal to or greater than a first threshold that is smaller than the maximum output torque of the engine, the compression release cylinder selecting part selects three compression release cylinders if the required torque is equal to or less than a second threshold that is smaller than the first threshold, and the compression release cylinder selecting part selects two compression release cylinders if the required torque is equal to or greater than the second threshold and less than the first threshold.

5. The engine control device according to claim 1, wherein the compression release cylinder selecting part selects the one or more compression release cylinders from the plurality of cylinders so that durations of compression release for each cylinder serving as the compression release cylinder becomes equal.

6. The engine control device according to claim 1, wherein the fuel injection amount determining part determines the amount of fuel injection such that an output torque of the engine at a time when fuel in the amount of fuel injection was injected into the operating cylinder becomes a sum of the load torque and the required torque.

7. The engine control device according to claim 1, wherein the compression release cylinder selecting part does not select the one or more compression release cylinders if a maximum power generation torque required for the generator to generate electric power at a maximum amount of power generation is equal to or greater than the residual torque, and the compression release cylinder selecting part selects the one or more compression release cylinders if the maximum power generation torque is less than the residual torque.

8. The engine control device according to claim 7, wherein the compression release cylinder selecting part selects one compression release cylinder if a value obtained by subtracting the load torque by the one compression release cylinder from the residual torque is equal to or less than the maximum power generation torque, and the compression release cylinder selecting part selects two or more compression release cylinders if a value obtained by subtracting the load torque by the one compression release cylinder from the residual torque is larger than the maximum power generation torque.

* * * * *